Figure 4:
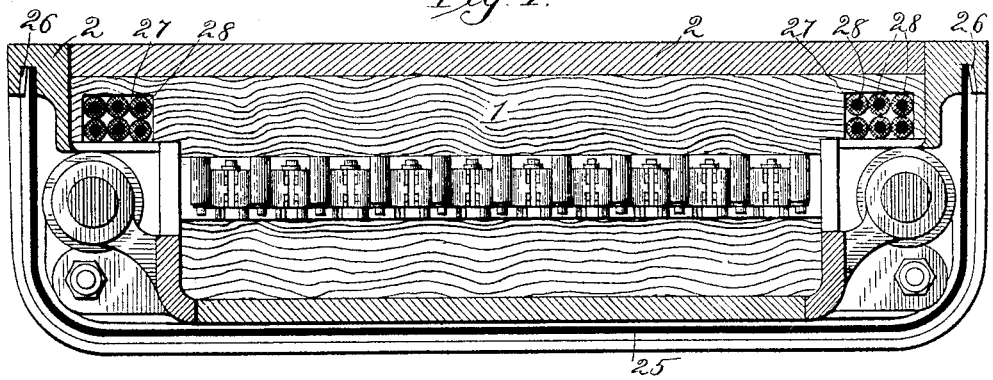

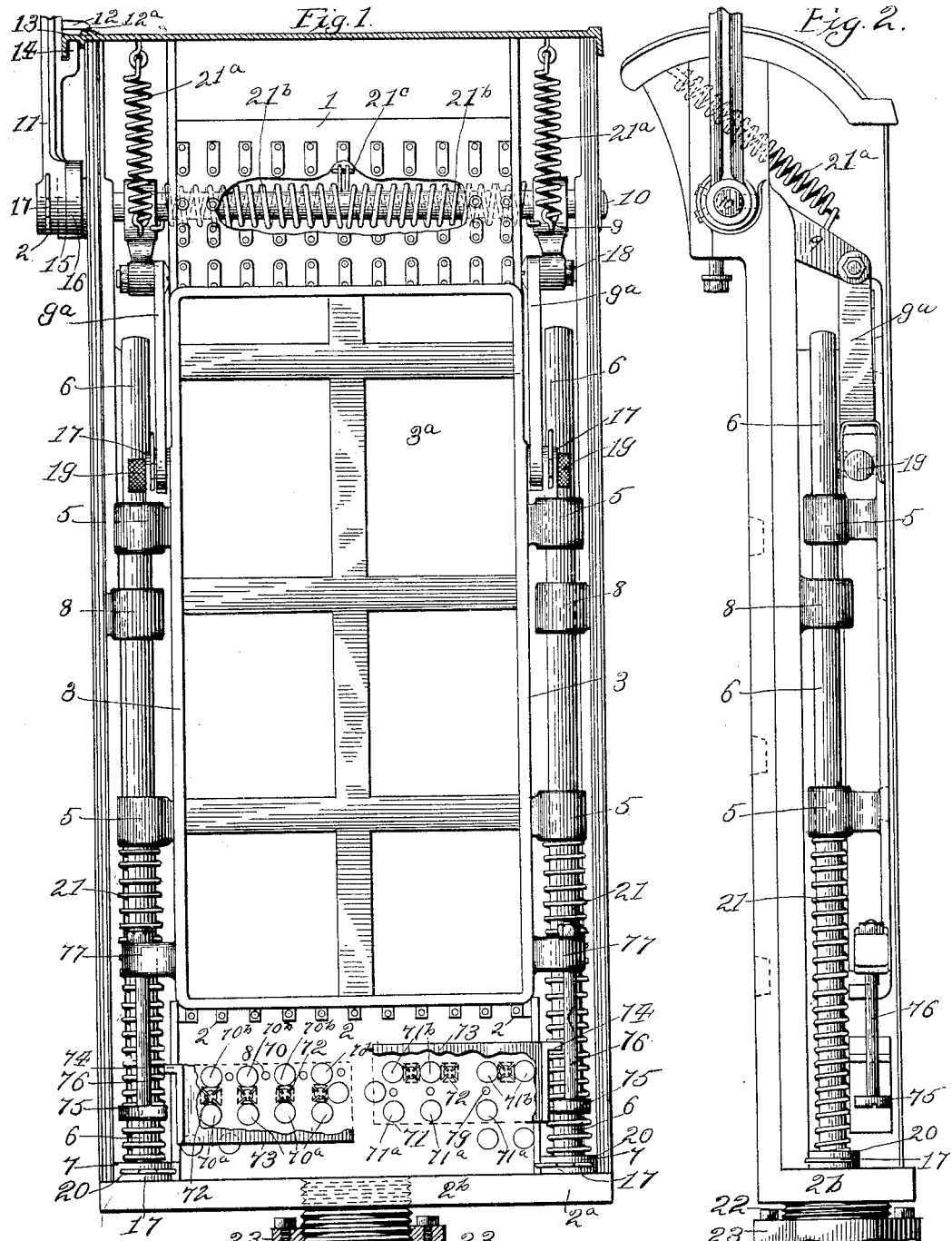

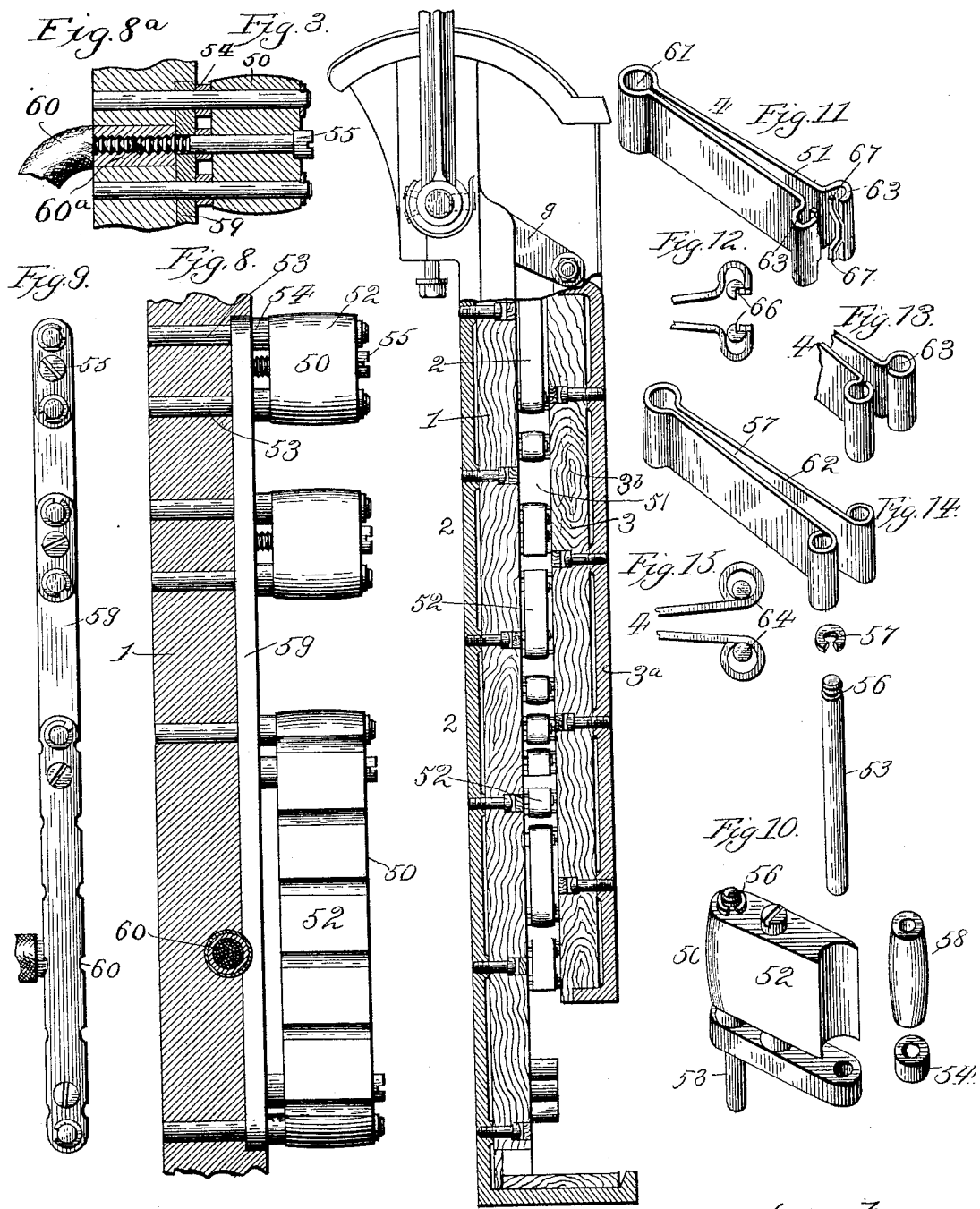

(No Model.) 6 Sheets—Sheet 3.

S. W. HUFF.
CONTROLLER FOR ELECTRIC CARS.

No. 581,557. Patented Apr. 27, 1897.

Witnesses:
Herbert Bradley
Jas. M. White

Inventor:
S. W. Huff
by Knight Bros
Attys.

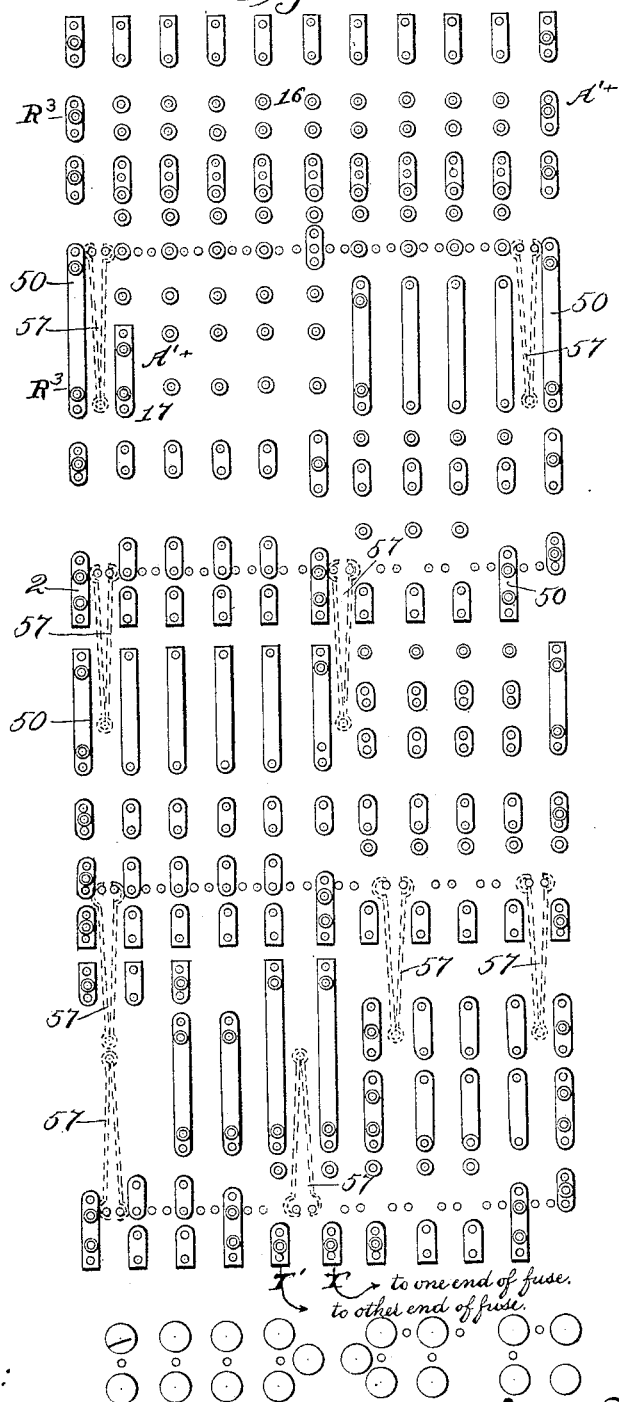

(No Model.) 6 Sheets—Sheet 5.
S. W. HUFF.
CONTROLLER FOR ELECTRIC CARS.

No. 581,557. Patented Apr. 27, 1897.

Witnesses:
Herbert Bradley.
Jas. W. White.

Inventor:
S. W. Huff
by Knight Bros
Attys.

(No Model.) 6 Sheets—Sheet 6.

S. W. HUFF.
CONTROLLER FOR ELECTRIC CARS.

No. 581,557. Patented Apr. 27, 1897.

Witnesses:
Herbert Bradley
Jas. W. White

Inventor
S. W. Huff
By Knight Bros
Attorneys

THE NORRIS PETERS CO., PHOTO-LITHO., WASHINGTON, D. C.

UNITED STATES PATENT OFFICE.

SLAUGHTER W. HUFF, OF BALTIMORE, MARYLAND, ASSIGNOR OF ONE-HALF TO JESSE HILLES, OF SAME PLACE.

CONTROLLER FOR ELECTRIC CARS.

SPECIFICATION forming part of Letters Patent No. 581,557, dated April 27, 1897.

Application filed July 26, 1895. Serial No. 557,213. (No model.)

*To all whom it may concern:*

Be it known that I, SLAUGHTER W. HUFF, a citizen of the United States, and a resident of Baltimore, in the State of Maryland, have invented certain new and useful Improvements in Electric-Current Controllers, of which the following is a specification.

My invention is designed primarily as the series parallel controller for use on electrically-propelled vehicles, but it involves novel features of construction which are adapted for general application in controlling electric currents.

The object of my invention is to provide an apparatus which will occupy much less space than devices now in use for similar purposes and which will be of simple construction and give wider range for setting up circuit connections and permit a large increase in working combinations in order to secure more practical and economical operation of the motive power, as well as more efficient service of the same.

My invention consists in arranging upon one plane surface the contacts representing the connections to be made and upon another plane surface bridging-pieces adapted to electrically connect said contacts, the plane parts being provided with means for giving to them the required relative movement to make and break connections as necessary.

My invention further consists in multiplying the number of contacts and bridging-pieces in a given connection and arranging the same in a straight line at right angles to the direction of movement in order that there may be a multiple break and arcing substantially avoided.

The invention further consists in providing, in the conductor leading from the source of supply, an automatic cut-out consisting of coöperating contacts, preferably enough to make effective multiple break, one set of said contacts being carried by a movable part of the controller-housing—such, for instance, as a hinged cover—in order that the current will be completely cut off by the act of opening the controller for any purpose.

My invention further consists in combining with the ordinary fuse-wire automatic cut-outs which will completely separate the fuse-block from line connections by the act of opening its closure when it becomes necessary to replace it. This is preferably done by mounting the fuse-block on the movable cover and having the connection of the fuse with the line effected by means of contacts which are separated by the opening of the cover and brought together by the closing of the same. These contacts may be included in the series of multiple-break contacts, which are likewise under control of the cover.

My invention further consists in combining with the binding-posts of the fuse-block a pair of additional posts or supports, to which the fuse is attached for the purpose of receiving the burning and adhering metal incident to a blow-out, and thus protect the binding-posts proper from these objectionable results of such an emergency.

My invention further consists in combining with the fuse-block a short-circuiting device which, when the fuse burns out in an emergency and current is necessary for the control of the car, may be immediately called into play to temporarily short-circuit the burned fuse.

My invention further consists in certain novel arrangements of circuit connections, among which are a combined multiple and series arrangement of armatures and fields whereby the speed of one armature resulting from the slipping of its driven wheel does not effect a cutting out of the other armature; a new and useful car-circuit disconnected from the line and with armature connections reversed, whereby an automatic braking effect is provided; the introduction of resistance into the closed car-circuit to control the braking effect, which resistance may be in the form of a heating system for the car or cars, and the arrangement, in connection with reversing-circuits, of an automatic fuse short-circuiting connection.

My invention further relates to certain novel details in connection with the foregoing features.

Figure 5:
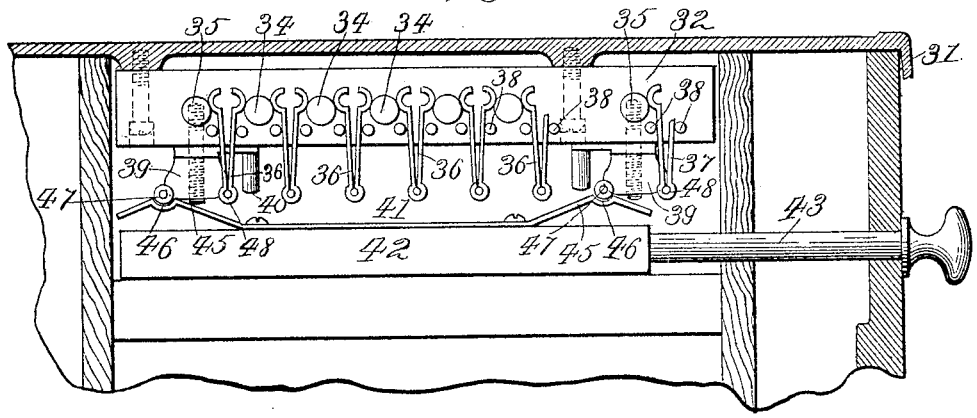
Figure 6:
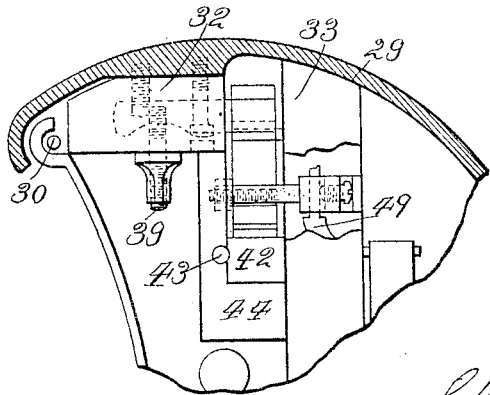
Figure 17:
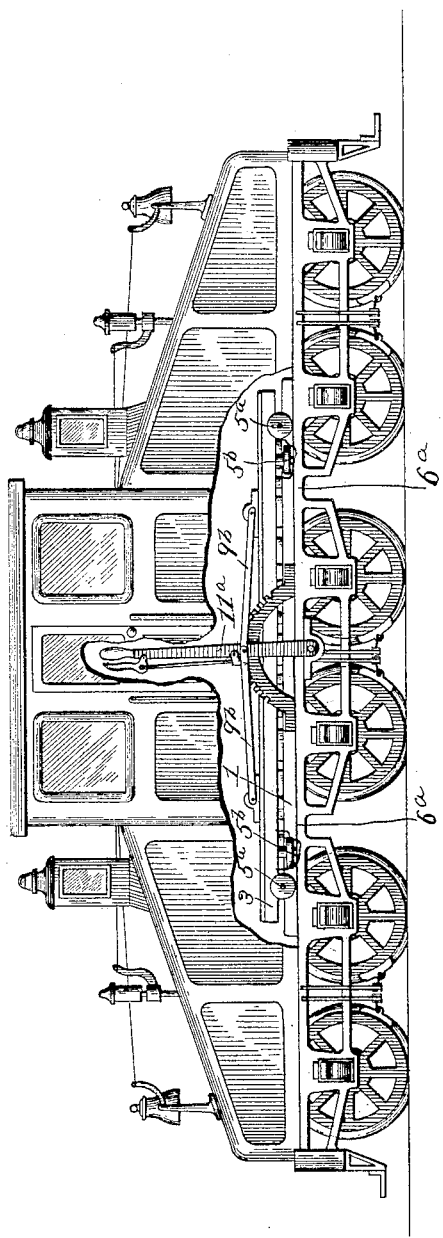
Figure 18:
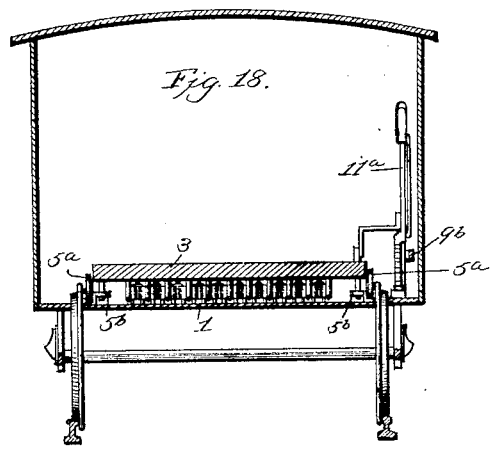
Figure 19:
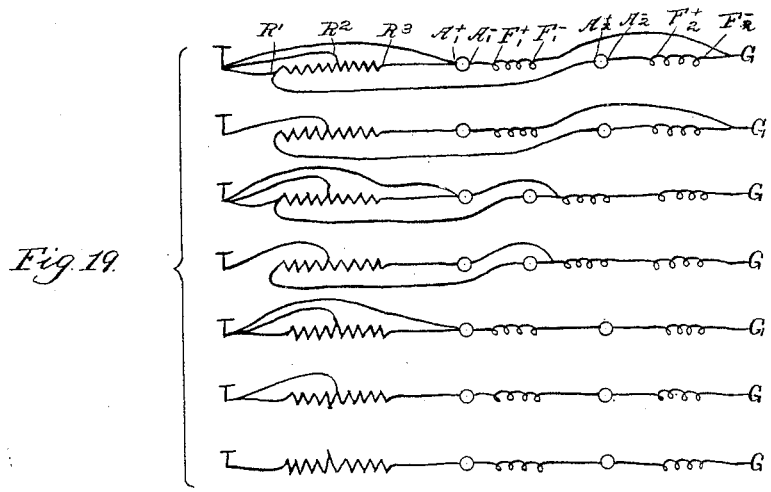
Figure 20:
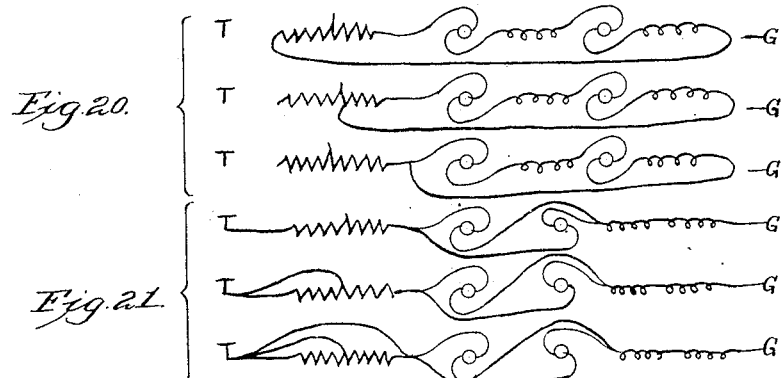
Figure 21:
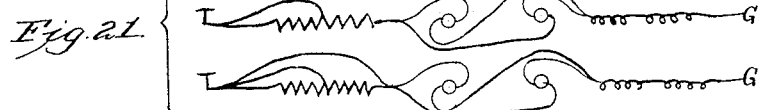

In the accompanying drawings, Figure 1 is a front elevation of the controller with the inclosing casing removed and the movable top in section and arranged for application to a car-platform. Fig. 2 is a side elevation of the same. Fig. 3 is a vertical transverse section of the controller with the operating-handle in elevation. Fig. 4 is a horizontal section through the controller and its inclosing casing. Fig. 5 is a vertical section from side to side of the upper end of the controller, showing in front elevation the multiple cut-out and the fuse-block carried by the hinged cover and the fuse short-circuiting device. Fig. 6 is a vertical section from front to rear showing in end elevation and by dotted lines the parts disclosed in Fig. 5. Fig. 7 is a view disclosing the arrangement of terminals and contacts for service in controlling an ordinary two-motor car. Figs. 8 and 8$^a$ represent in side elevation the terminals with their insulating supporting-base in section and showing two ways of electrically connecting a number of such terminals in groups with a single conductor. Fig. 9 is a plan of the same. Fig. 10 is a perspective view illustrating the construction of one of the terminals and the manner of attaching the same to the insulating-base and showing in addition to these features a replaceable tip which is preferably used at points where there is arcing in order to permit the replacing of burned portions at slight expense. Figs. 11 and 12 represent in perspective and in top view the preferred form of spring-contact. Figs. 13, 14, and 15 represent another type of the same device, but differing in the mode of limiting yielding movement of the free ends of the bifurcated spring. Fig. 16 is a detail view of one of the cut-out plugs for bridging between contacts on either pair of its opposite sides. Figs. 17 and 18 represent in side elevation a vertical transverse section, the adaptation of my invention for heavy work, and the location of same beneath or on the floor of an electric locomotive or car. Figs. 19, 20, and 21 represent combinations of working circuits, respectively, for the ordinary forward-running steps, novel automatic braking steps, and novel current-reversing steps to be hereinafter referred to.

Referring to Figs. 1 and 2, 1 represents a plane backing of insulating material upon which are arranged terminals to be connected for establishing and breaking circuits in the manipulation of the motors, the said backing being mounted upon a metallic frame 2 and forming therewith an insulated bed or support. This bed or support may be constructed to go against the dash of a street-car, or it is well adapted for location on or beneath the car-floor. If used in the former position, it is secured to the dash by bolts 2$^a$ (of which one only is shown, but of which there may be any suitable number) and has a base 2$^b$, on which are supported mechanical parts of the apparatus, as will presently appear.

3 represents a flat metallic carriage carrying a suitable backing 3$^a$, of insulating material, and arranged to reciprocate in close proximity and parallel to the plane-support 1. The reciprocating carriage 3 carries bridging-contacts, to be presently referred to, which enter between and close the working circuits through the terminals on the bed or support.

To permit the carriage 3 to slide up and down in front of or over the bed or support, the former is either provided with bracket-bearings 5, sliding on uprights 6, which are mounted in steps 7 on the base 2$^b$ and held by supporting-brackets 8, formed integrally with the metallic frame 2, as shown in Figs. 1, 2, and 4, or said carriage has wheels 5$^a$, running in tracks 6$^a$, as shown in Figs. 17 and 18. In either case the carriage has sliding bearings on the bed. Reciprocating motion is imparted to the carriage 3 by crank-arms 9, connected to the carriage by pitmen 9$^a$ and mounted upon a rock-shaft 10, which is under control of a hand-lever 11. For platform use lever 11 carries an indicator 12, working over a segment 12$^a$, while a finger 13 engages behind a flange 14 to confine the lever against displacement. The hand-lever 11 has turning connection with the shaft 10 through the medium of a fin 15, which enters a groove formed across the inner face of the hub of said hand-lever, said fin being carried by a collar 16, fixed upon the shaft. The lever is held on the end of the shaft in engagement with the fin by means of a snap-latch 17, which consists of a spring secured to the hub and carrying a pin pressed by said spring through an opening in the hub into an annular groove formed in the shaft. As this snap-latch can be seen in full and dotted lines in Fig. 2 and is a common expedient, it need not be here further described. It forms a convenient means of attachment and permits ready detachment for changing the operating-handle from one end of a car to the other. The pitmen 9$^a$ have connection with crank-arms 9 through the medium of bolts 18, but I prefer to have the connections of these pitmen with the carriage 3 detachable, and for this purpose employ milled pins 19, which pass through portions of the carriage and through said pitmen and are held against displacement by snap-latches 17, as described with reference to the handle 11. In like manner the standards 6 are detachably mounted in their steps 7 by snap-latches 17, carried by the steps, arranged to enter annular grooves formed in the said standards. In each case the spring of the snap-latch 17 is secured on one side of the part to which it is attached, is bent around the same to where the retaining-pin enters, and terminates in an upturned end which is readily engaged by the finger when it is desired to withdraw the pin and remove the part that is secured.

To equalize the work to be performed in opposite directions by the handle 11, counterbalancing-springs 21 are confined on uprights 6 between the sliding brackets 5 and steps 7, and thereby sustain the weight of carriage 3, or counterbalancing-springs 21$^a$ are used, Figs. 1 and 2. Another form of counterbalancing-spring is shown at 21$^b$ in Fig. 1.

This is coiled on the controlling-shaft and is secured thereto and to a fixed part of the apparatus. I prefer to secure this spring immovably at its middle point 21$^c$ and to coil it in opposite directions outward around the shaft 10 and to secure its ends to the respective cranks 9.

With the mechanical features of the relatively-moving support and carriage which respectively carry the terminals and bridging-contacts it is an easy matter to remove the carriage from in front of the base by withdrawing the pins 19 at the pitman connections and the uprights 6 from the steps 7 and lifting the carriage up, or access may be had to both the terminals and the bridging-contacts by removing both pitman connections and withdrawing one of the uprights 6 and then swinging the carriage out on its opposite bearings as a hinge. In Figs. 16 and 17 the carriage is simply lifted up.

To assist in securing the controller in place on platforms and affording a conduit for the entrance of all conductors to the controller, a thimble 22 is threaded into the base 2$^b$ and carries a threaded attaching-flange 23, through which are passed screws 24, which enter the car-platform. By means of the upper connection 2$^a$ to the top of the dash and lower connection to the platform the controller is held rigidly in position and lies up close to the dash in order to require a minimum amount of space. Extra fore-and-aft dimension in the upper part, where the indicating-segment is mounted and the safety appliances are carried beneath the hinged cover, is obtained by extending the mounting over the dash.

Referring to Figs. 3 and 4, it will be observed that the controller is provided with a casing 25, which surrounds its front and sides and enters vertical slots 26 in the metallic frame 2. It will further be seen that the wooden or insulating backing 1 has vertical channels 27, in which are laid the conductors 28, employed in making various connections with the terminals. The casing is surmounted by a cover 29, hinged at 30 and adapted to inclose the edge of the casing 25 by downturned flange 31. Beneath the cover is mounted an insulating-block 32, while projecting upward from the controller is a similar block 33. Block 32 carries a series of pins 34 35, which engage with a number of bifurcated contact-springs 36 37, mounted on the block 33 and limited in their spreading movement by stops 38. The pins 35 on the block 32 extend inward and are intersected by binding-posts 39 for the fuse-wire, (not shown,) while in electrical connection with these binding-posts 39 are the winding-posts 40, arranged so that the fuse-wire can be wound around said posts 40 and then passed beneath the binding-posts 39 for fastening. The object of this is to cause all the leading and burning which take place when the fuse is blown out to take effect on the posts 40, and thus save the binding-posts 39 from these disagreeable results, which cause a loss of time and much annoyance in replacing a fuse.

From the foregoing description it will be observed that when the cover 29 is swung up on its pintle 30 each of the terminal pins 34 35 will be drawn away from the spring-contacts 36 37. This construction is utilized as an automatic cut-out and a multiple break for the working current, so that it is impossible to open the controller for any purpose without first severing the connection with the line and through the medium of a multiple break. This is very important to avoid loss of time in replacing the fuse-wire. This control of the current is effected by connecting the incoming conductor of the supply-circuit to the contact 37 and connecting the contact at the end of the series 36 to the controller, so that the circuit will be from the trolley to the contact 37, through terminal 35 to binding-post 39, through the fuse-wire to the opposite binding-post 39, to opposite terminal 35, then through the series of contacts 36 and terminals 34 to the end of the series, and then to the controller proper. In addition to these connections I likewise mount in the upper end of the controller-box a fuse short-circuiting bridge 41, carried upon a sliding block 42, which is under control of a draw-rod 43 and mounted to slide in a bracket 44. It has upturned contact ends 45, provided with concave seats 46, which normally receive and are held in place by idle terminals 47. When the rod 43 is drawn out, the seats 46 will come into similar engagement with the rounded ends 48 of the contacts 36 and 37, so as to close the circuit directly from one to the other and short-circuit the fuse. This device is of special importance in the event of the fuse being blown out in an emergency and where current is absolutely essential for manipulating a car.

49 represents one of the connections made between the contact-springs 36 37 and the terminals of the line, in which the multiple-break fuse-block and the fuse short-circuiting device are inserted, as above described.

Referring to Figs. 3 and 7 to 15, 50 represents the terminals, which are mounted upon the insulating-backing 1, and 51 are the spring-contacts, which pass between the terminals 50 and electrically connect them and the circuits which they control. The relative arrangements of these parts on their respective insulating-mountings will be understood from Fig. 7, while the construction of the terminals will be seen more clearly in Figs. 8, 9, and 10 and the contacts in Figs. 11 to 15. Each terminal 50 comprises a bearing-piece 52, regulated in length according to the desired duration of the impingement of the moving spring-contact 51 and held at its ends by pins 53, which pass through the bearing-pieces and through supporting-washers and are driven or screwed into the insulator-backing. The bearing-pieces 52 may be further secured by intermediate screws 55. To permit ready removal of the bearing-pieces 52, each pin 53 has an annular groove 56 at its head, in which fits an open washer 57, which is closed around said groove.

If the bearing-piece 50 is to be used at a point where the arcing is bad, it may be concaved at one end, as shown at Fig. 10, and provided with a wearing-tip 58, which is removably secured in place by the rod 53, as described with reference to the bearing-piece 52. This provides for an inexpensive replacing of wearing parts of these pieces 52.

As may be seen on reference to Fig. 7, some of the terminals provide elongated portions upon which sliding contact is made and have at their ends the removable and rotatable tips forming continuations of the elongated parts, being substantially the same in height and thickness as said elongated parts. At other points the duration of the contact is so short that I employ simply a transverse series of the rotatable tips. When the bridging contact-springs move along in the spaces between these tips or rollers, they bear simultaneously and with more or less uniformity of pressure on opposite sides of the tips. This produces important results of insuring a rubbing contact, which keeps the surfaces of the parts bright, while the tips are nevertheless rotated slightly either as the contact is made or broken and a new wearing-face constantly presented.

When a number of terminals adjacent to each other are to be connected to the same wire, I employ a connecting-strip 59, which runs beneath the said terminals and is embedded in insulating-backing 1, together with its attached conductors 60. The connectors 60 may either be embedded in a board and attached sidewise to the bearing-pieces 50 or to the connecting-strips 59, as shown in Figs. 8 and 9, or these connectors may pass up behind the insulating-board through a space left between said board and the metallic backing and connect, as illustrated in Fig. $8^a$, by a sleeve $60^a$, which is threaded and soldered upon the end of the connector, and said sleeve is then inserted in an opening formed through the insulating-board opposite a securing-screw 55, which enters the open threaded end of the sleeve. By this means when the screw 55 is tightened it not only draws the bearing-piece 52 tightly to its seat, but it also draws the connecting-sleeve $60^a$ into intimate contact with said bearing-piece 52 or with the strip 59 and thus makes good electrical contact.

The spring-contacts are preferably made of a piece of brass bent, as shown in Figs. 11 to 15, to form the attaching-eye 61 for receiving the attaching-pins 53 56 57 and spring-arms 62, which terminate in curved bearing ends 63. The ends 63 have a limited yielding motion for the purpose of making proper contacts with the terminals 50 and to insure accurate severance with all terminals ending in the same line. This motion is limited by pins 64, which are inclosed by the rounded ends 63, and either the pins are provided with longitudinal recesses 66, which receive inturned tongues 67, as shown in Figs. 11 and 12, or the rounded ends 63 are themselves made large enough to permit necessary play on the pins 63, as shown in Figs. 13, 14, and 15. At the bottom of the backing 1 are provided groups of additional terminals 70 71, which serve as the means for bringing the conductors leading from the ground, from the different parts of the resistance, and from the different terminals of the armatures and fields of the motors into connection with corresponding wires of those terminals of the controller which are to be impinged upon when circuit is to be made with these parts of the system.

When in practice it may be desired to provide for cutting any part or parts of the system in and out of connection with the controllers at will, I employ for each connection two terminals $70^a$ $70^b$ or $71^a$ $71^b$ and a bridging-contact 72. For example, to provide for cutting in or out at will a motor or motors in a system employing a plurality of motors on a car and to employ only the other or remaining motor or motors two connecting-terminals $70^a$ $70^b$ or $71^a$ $71^b$ are employed for each part of the motor or motors cut out, one of which is connected to the motor part and the other to the proper controller-terminal, and for convenience these terminals are arranged in two corresponding symmetrical series, and all their bridging-contacts 72 are mounted on a block 73, so as to be placed in position and join the corresponding terminals in pairs by a single movement of the block. Each motor to be cut out or all the motors, in order that any one or more may be cut out, has its connections with the controller made through similar pairs of terminals and interposed contacts and all the contacts for each motor are grouped upon a separate independently-movable block. By the nature of the arrangement of the connections in series parallel controllers, and especially when running on the series notches in such, the controller-terminals and connections of each motor are depended on more or less for completing circuits through the other motor or motors. To provide under these circumstances for preserving the continuity of circuits for the motor or motors left in, the series of upper contacts are spaced apart the same distance as the corresponding terminals of the two series, so that contacts adapted to bridge the latter will fit between the former, and by simply setting up the blocks in the manner illustrated at the right hand of Fig. 1 all the upper series of terminals will be connected together, and therefore any connection made with any one of their controller-terminals will insure a through-circuit, it being arranged that at least two of the said upper series of each group remain connected with the points from which the current is received and to which it is delivered by the motor of said group. The multiple or parallel circuit connections are only made by the controller on approaching the forward limit of its movement. I therefore employ a projection 74 on each block 73, which, when said block is set into the upper position to cut out its motor, will extend out into the path of the head 74 of a depending screw 75, which is carried by a bracket 77 on the carriage 3. By this means when a motor is cut out the carriage will be prevented from moving up such a distance as would call into play any combination of contacts which are arranged to effect multiple connections.

The construction of the contacts 72 will be understood upon reference to Fig. 16. Each consists of a pin 78, which is adapted to enter sockets 79 in the cut-outs 70 71 and which are slotted at four points to receive the yielding contacts 80, which approach each other by inturned portions 81. When the blocks of these contacts are placed in such a position as to cause the pins 78 to enter the sockets 79 between terminals, each upper terminal $70^b$ or $71^b$ of the groups 70 71 will be electrically connected to the one beneath it; but when the block is set up, so that pins 80 enter the sockets 82, then there will be no circuits to the parts of the motor controlled by said block, but there will be unbroken connection through the upper terminals in order not to affect the remaining motor or motors, which still depend for circuit on the same number of terminals and contacts of the controller.

The arrangement of the operating-terminals of the controller may be seen upon reference to Fig. 7. They are arranged with longitudinal passage-ways between them, in which the bridging contacts travel and where a bad break is to be made a number of the terminals are employed in the circuit for the purpose of dividing up the arc.

There are other especial advantages in having the terminals arranged on one surface and the bridging contacts on another surface and projecting in between the terminals. This results in a great saving of room and affords greater extent of contact-surface. If it becomes necessary to provide a controller for heavy work, I am enabled to increase the height of the terminals and contacts from their supporting insulating-bases, and, as will readily appear, each unit of increase in the overlapping dimension of these parts gives two units of increase in the contact-surface at the point of breaking. I am also enabled by the general plan of my device to locate it conveniently upon the floor of an electric locomotive, as shown in Fig. 16. Here the moving part 3 is provided with vertically and horizontally presented wheels $5^a$ $5^b$, which guide said part as it is moved by lever 11 through pitmen $9^b$ back and forth over the fixed base 1.

Fig. 21 represents seven ordinary working steps for running forward. In connecting up the terminals for the purpose of effecting the different combinations of circuits for the ordinary working of motors, and passing from one combination to another by successive steps in the movement of the controller, it is customary to start with all the resistance and the motors connected in series, then gradually reduce the resistance to leave motors in series without resistance, then to cut out one of the motors, then to again introduce said cut-out motor together with all the resistance in the multiple, and then to cut out the resistance so as to leave the motors connected in multiple without any resistance and give the highest running power. The manner of doing this is varied somewhat in detail, generally requiring about ten steps or changes. Objections exist in this, however, from the fact that there are not enough working combinations to give the proper gradual starting of the car, that it does not permit the gradual reverse movement of the controller for slowing down without excessive sparking, it being necessary to entirely cut off connections and then work forward to the proper point again, that it does not give satisfactory work under conditions where the wheels slip, and that a separate handle must be manipulated for reversing.

With my improved arrangement of contacts I am enabled to introduce a number of new steps in making combinations, whereby the resistance is so employed as to permit of gradual movement of the handle in either direction for the purpose of working up or down to increase or diminish motive power without undue sparking, whereby the running effect is greatly improved, and whereby reversing is effected by continued backward movement of the hand-lever. To prevent sparking in either movement of the handle, the terminals and contacts are so arranged that before one connection is broken the succeeding connection is made, and wherever a bad break would occur I introduce an intermediate step and first insert resistance and then gradually cut out said resistance. Furthermore, by the use of wide series of terminals across the insulating-backing, which represent twice that number of breaks in circuits in that line, I am enabled to practically avoid destructive arcing at points where breaks are necessary. To introduce more effective running connections to prevent one motor cutting out another when slipping takes place, I arrange a step (illustrated by Fig. 21) by which the fields of the motors are retained in series while the armatures are connected in parallel. This is shown only on reversing steps, but it is found in practice to produce a very good effect in forward running on slight grades or in running under other circumstances where the car-wheels are liable to slip. With the simple series arrangement of circuits, when running under such circumstances, one pair of wheels slipping would permit the drivingarmature to race, and this had the effect of cutting out or weakening the current from the other armature and greatly impeding the progress of the car. With my improved new arrangement of circuits, with the fields in series and the armatures in parallel, this undesirable effect will not result from the slipping of either pair of wheels.

A further improvement relates to a reduction of the friction incident to maintaining a combination of connections during a continued movement of the contacts, and this is accomplished by continuing one pair or more and discontinuing the remaining terminals over the necessary distance and permanently connecting the continued terminals across the space of those not continued. This will be understood on reference to Fig. 7. During the changes above the horizontal line 17 it is desired to continue the connection of the end of the resistance connected with and represented by terminals $R^3$ to the positive pole of armature No. 1, (represented by $A^+_1$,) the terminals $R^3$ and $A^+_1$ are continued the desired distance and directly wired across the space where other terminals would occur on the same line; but this forms a bad break when returning, and to have but a double break would involve too much sparking. Therefore I arrange for the row of contacts next above to make this same connection on a line (16) having twenty breaks, and which, it will be understood, comes into use just before the other bridging contact leaves the terminals $R^3$ $A^+_1$ on the line 17.

A further improvement in my controller is the provision of enough additional steps in the rearward movement of the handle to afford several effective reversing combinations and combinations of circuits which will automatically brake the momentum of the car without current from the line; also a combination of connections which when opposing the car's momentum by a reversal of the motors will effect a short-circuiting of the fuse to prevent a blow-out in such an emergency. (See Fig. 7, wherein terminals T and T' are connected to opposite ends of the fuse and the reverse movement of the controller first bridges these two terminals and thereby short-circuits the fuse.) These consist in first completing a local circuit through all the resistance and the motors in series, with the armatures reversed, (see first step in Fig. 20;) second, a reduction and elimination of the resistance from such local series circuit, (see second and third steps, Fig. 20;) third, again introducing the line-circuit through the resistance, dividing the current between the armatures in reverse multiple, thence to both fields in series, Fig. 21, and, finally, gradually eliminating the resistance in such circuits. The foregoing combinations are especially advantageous in running a car. The method of stopping or slowing a car by reversing the connection in the armatures and connecting the extreme ends of the circuit, and which may include the resistance and motors or the motors alone, the braking effect is produced whether the motors are connected in series, in parallel, or in series parallel, the armatures being in parallel with each other and in series with fields which are in series with each other, or the fields being in parallel with each other and in series with the armatures which are in series with each other. By varying the resistance the braking power can be varied at will, and it may be done by varying either the regular car resistance or a special resistance in the form of a heater. This braking effect will be present though a single motor is in circuit. The advantages in this system are that the movements are all accomplished by a single handle and the braking effect is not dependent upon one motor being opposed to the other, as has heretofore been proposed, and the action therefore does not have to wait upon any process of one motor getting advantage over the other, but begins from the instant that the handle begins to move, and increases gradually but quickly until the car is brought almost to a stop, when it releases in time to save the bad jar characteristic of automatic-braking arrangements in other controllers. Moreover, by this method of regulating the braking effect it is practicable to heat a car entirely by the use of a special arrangement of car resistance or by using a special resistance in the form of a car-heater.

Having thus described my invention, the following is what I claim as new therein and desire to secure by Letters Patent:

1. In a current-controller, the combination of two relatively-movable plane parts, a series of terminals to be connected, suitably spaced apart on one of said parts, and a corresponding series of bridging contacts carried by the other of said parts each projecting into a space between two adjacent terminals and pressed against the opposed faces of the same, as explained.

2. In combination with an electrically-propelled vehicle having a dash, the herein-described controller comprising two flat parts carrying the respective terminals projecting in between each other to bring them into the same plane and cause lateral contact; one of said parts being fixed on the dash substantially parallel therewith and the other being arranged to slide vertically in front of said fixed part for the purpose set forth.

3. In a controller for electrically-propelled vehicles the combination of a suitable plane support of relatively small thickness, contacts arranged upon one face of the support in rows so as to leave unobstructed channels between them, a second flat part mounted to move relatively to the said support and carrying the coöperating contacts projecting into and traveling in said channels and impinging laterally against said contacts and means mounted upon one and connected with the other for moving said movable part, as explained.

4. In a controller for electric vehicles, the combination of two flat parts arranged for mounting against the dash relatively movable by a handle swung fore and aft and carrying the circuit connecting contacts and terminals, and the upper enlarged portion projected forward over and forming an offset for resting upon the dash and having formed upon it the guiding-segment of the handle as explained.

5. A controller comprising two parallel flat parts each carrying conducting parts to be brought together, and one of said parts having an enlargement for projecting over the dash, and reciprocating mechanism consisting of a crank-shaft journaled on the enlargement above the dash and having a crank-arm extending in over and making connection with the movable part as explained.

6. In a controller the combination of the support adapted for mounting on the dash and the part movable thereon carrying respectively the terminals and bridging contacts, the pedestal $2^b$ on the support and the hollow thimble 22 on said pedestal forming a means of connection through the platform, for the wires as explained.

7. In a controller for electric cars the combination of the fixed and movable parts, the hollow thimble on the fixed part forming a conduit for wires and means of attachment and the adjustable collar substantially as set forth.

8. In combination with the dash of an electrically-propelled vehicle, the flat support 2, secured vertically against said dash, a carriage movable in front of said support, a hand-lever mounted on a horizontal axis on the upper part of the support and movable back and forth in a vertical plane and connection between said shaft and the carriage, as explained.

9. In a controller for electric vehicles, the combination of the flat vertical support, uprights, stepped in the base of said support and held by side brackets, the carriage movably secured by bearings 5 on said uprights in front of the support, and means for controlling the movement of the carriage as explained.

10. In a controller, the combination of the vertical support, a carriage carrying contacts and terminals and movable up and down in front of said support, bars detachably stepped in the base of said support and providing a mounting for the carriage, the electric contacts to be brought together as explained.

11. In a controller the combination of the support, having the guiding-bars, the carriage mounted to slide on said guiding-bars the crank-shaft for controlling the movement of the carriage and the counterbalancing-springs, on said crank-shaft, as and for the purpose explained.

12. In a controller, the combination of an upright support formed with a horizontal base, the standards mounted removably in sockets on said base and supported by eye-brackets on the support, and the carriage having projecting bearings for securing it sliding on the standards, and means for controlling the movement of the carriage, as explained.

13. In a circuit-controller for electrically-propelled vehicles, the combination of a flat insulating-base adapted to be mounted upon the vehicle and provided with a rectangular group of terminals spaced apart to leave a series of parallel channels between them, a second flat insulating part mounted to slide in bearings upon said base, provided with a corresponding rectangular group of bridging contacts located to enter the channels between the terminals and make lateral contact with them and a lever mounted upon an axis parallel to the base, connected with the movable part, and having a handle projecting for manipulation, as explained.

14. In an electric-circuit controller, the combination of a suitable casing having a swinging top, a series of springs inserted in the line conductor, and having enlarged ends, a series of pins arranged to enter between the springs and to electrically connect them in series; and press past the enlarged ends for holding the parts in relation; one of said series of parts being fixed while the other is carried by the swinging top, whereby a multiple break is effected by the act of opening the cover, as and for the purpose set forth.

15. In an electric-circuit controller, the combination of two series of contacts one of which is fixed and the other movable; the contacts of one series being juxtaposed as shown, and formed each with two free self-expanding parts having enlarged ends, and the other series of contacts being located to cause each individual contact to enter between and electrically connect each of the self-expanding parts with the corresponding parts of the adjacent contacts, substantially as set forth.

16. In an electric-circuit controller, the combination of the removable cover, a fuse-block carried by said cover, a series of terminal pins projecting from said block and arranged to divide the connections between the opposite ends of the fuse and a series of contact-springs for bridging said terminals, arranged in controlling relation to the feed-wire, as explained.

17. In combination with a circuit-breaker, for use substantially as described, a fuse-block having fuse binding-posts upon one side thereof, terminal pins projecting transversely to and mechanically connected with the said fuse binding-posts, and springs having their free ends in position to receive said pins and for a circuit-breaker, as explained.

18. In a current-controller, for electric vehicles, the combination of the series of fixed bifurcated contact-springs having upwardly-presented free ends and a series of coöperating terminal pins projecting between and connecting the ends of adjacent springs, a movable block from which said terminal springs project and a pair of fuse-attaching terminals mounted upon said movable block and connected to the respective ends of the series of terminal pins as explained.

19. In a circuit-controller, a fuse-block having mechanical supports for the fusible conductor in addition to and between the connectors therefor and electrically connected thereto to relieve the latter from burning and from the adhering of melted fuse material, as explained.

20. In combination with a fuse-wire, a pair of winding-posts, and a pair of binding-posts arranged with relation to the fuse as explained.

21. For use in connection with fuses, as explained a pair of fuse attachments arranged for receiving the ends of the fuse and also for electrically connecting the same in the circuit to be controlled and an additional pair of conducting mechanical supports, in circuit, as explained.

22. In an electric controller, for vehicles, the combination of a fuse-block, terminals in circuit on opposite sides of said fuse, and a fuse short-circuiting device, consisting of a slide having metallic band 41 formed with depressions 46 arranged to move into engagement with said contact as explained.

23. In a circuit-controller, a contact device having two yielding contact-arms with enlarged ends in combination with terminals located to be forced past the enlargements for making sliding and engaging contacts, as explained.

24. In a controller the combination of contacts carried by a movable part of the controller-housing, spring-terminals having rounded ends and arranged in circuit to form a multiple break with said controllers, a fuse-block inserted between terminals, and a fuse short-circuiting slide carrying a conducting-spring with upturned ends formed with concave seats and arranged to be drawn into engagement with the rounded terminal ends on opposite sides of the fuse for short-circuiting the latter, as explained.

25. In a controller for electric circuits, the combination of a pair of contacts connected with the fuse having ends for engagement, and a spring-contact suitably secured on a sliding mounting and having upturned ends with concave seats for engagement with the ends of said contacts for short-circuiting the fuse, as explained.

26. In a fuse short-circuiting device, the combination of contacts 36, 37, electrically connected with the fuse and bridging-spring 41, having upturned ends 45, formed with concave seats 46 and beveled on opposite sides of said seats as set forth.

27. In a controller for electric circuits, the combination of a pair of parallel terminals and a bridging-piece consisting of a pair of spring-arms bearing at their free ends against terminals and having pins for limiting their movement substantially as explained.

28. A bridging-contact for substantially the purpose set forth constructed of a piece of metal bent to form diverging prongs, and having its ends bent into enlargements, to adapt it to make engaging contact as explained.

29. A terminal for substantially the purpose set forth comprising the contact-piece 52 having perpendicular contact sides with rounded ends and the attaching-pins 53 passing through the ends of said contact-piece as explained.

30. In an electric make and break, the combination of a part along which sliding contact is made and a tip 58 at the point of breaking, rotatably secured in place by a screw or equivalent device, so as to present a changing surface at the point of wear, as explained.

31. In an electric terminal the combination of the bearing-piece 52 having a concave end and the cylindrical bearing-tip 58 secured in working relation thereto by pin 53, substantially as and for the purpose set forth.

32. A terminal consisting of the rounded bearing-piece 52, pins passing through the bearing-piece and the washers 57 engaging in grooves 56 in the ends of said pins for the purpose of holding the bearing-piece in place as explained.

33. In a terminal for electric controllers the combination of the bearing-piece 52, the attaching-pins 53, the interposed washers 54, and the intermediate securing-screw 55 substantially as and for the purpose set forth.

34. The combination of the terminals consisting of the bearing-pieces 52 and the attaching-pins 53, and the electrically-connecting base-strips 59 beneath the bearing-pieces and secured in place by said pins 53 as and for the purposes set forth.

35. In a contact device, the combination of the bifurcated spring 51 formed with the attaching-eyes 61 and spreading arms 62, and the confining-pins 64, embraced by curved ends of the arms 62, and adapted to limit the movement of the free ends of said arms as explained.

36. The combination with a bifurcated spring-contact, having curved ends for impingement on the terminals to be connected and the inturned tongues 67, of the limiting-pins 64 having recesses 66 in which said tongues 67 engage, as and for the purposes explained.

37. The herein-described bifurcated spring-contact formed with the attaching-eye 61 and the rounded contact ends 63, in combination with the confining-pins 64 in the rounded ends and the attaching-pin 53 in the eye 61 having the securing-washer 57 engaging the neck 56 on the upper end of the attaching-pin as and for the purpose set forth.

38. In an electric controller, a bridging-contact consisting of the pin 78 and the radiating arms 80 having ends 81 bent toward each other to make yielding contact ends, as explained.

39. In a controller, two corresponding series of terminals interposed in the conductors which supply the translating devices and a block carrying bridging-contacts constructed to enter between and electrically connect the corresponding terminals of each series and also to fit at one side of the respective terminals of one series and connect them together when a translating device is to be cut out, as explained.

40. In combination with a multiple make-and-break controller for a plurality of motors for electrically-propelled vehicles, having terminals and contacts arranged to simultaneously alter the relations of the two motors, a series of terminals having connection with the respective parts of the controller, a series of corresponding terminals connected with the respective parts of the motors, and a group of bridging-contacts each interposed between two corresponding terminals of the two series to connect up the parts of the motor with the controller; said contacts being likewise constructed to enter between and electrically connect the individual terminals of the series which is connected with the controller, and thus permit continued use of the controller-contacts without breaking the through-circuit when one motor is cut out, as explained.

41. A cut-out for electric vehicles, consisting of a series of terminals suitably spaced apart and connected with the contacts of a controller, a series of corresponding terminals spaced apart from the series first named a distance equal to the space between adjacent terminals of said first series, and a group of bridging-contacts constructed to fit between corresponding terminals of the respective series when a motor is to be connected to the controller, and adapted to be removed from between the said corresponding terminals and to fit between adjacent individual terminals of the controller series as explained.

42. In a cut-out, the combination of a series of contacts mounted upon a suitable block and two series of terminals; the terminals in one series being spaced apart from each other and also from corresponding terminals of the opposite series a uniform distance equal to the bridging distance of the contact, substantially as set forth.

43. In combination with a controller for bringing two or more motors into series and parallel relation, and consisting of two relatively-movable parts carrying the contact devices arranged to connect the motors and manipulate them first in series and then in parallel relation, by continuous movement; a cut-out for one of the motors consisting of suitable terminals, mounted on a block and adapted to fit in between corresponding terminals and also to one side of one series thereof, and a projection on the contact-block so located as to project into the path of the movable portion of the controller and to prevent movement of the same far enough to make parallel connections, when said block is in position for cutting out the motor, as explained.

44. In combination with a plurality of motors on an electrically-propelled vehicle, a divided conductor leading from the source of the working current to the armatures, a united conductor leading from all the armatures to and sending all the current through the fields in series and a suitable controlling-switch as explained.

45. A controller for electrically-propelled vehicles comprising relatively-moving parts carrying circuit-closing devices, and conductors leading to the circuit-closing devices from the parts of the motors said circuit-controlling devices being so located that a movement of the parts carrying them will connect in circuit, the armatures in multiple relation to each other and the fields in series relation to each other and to the armatures, as explained.

46. In a controller for electrically-propelled vehicles, reversing connections in combination with fuse short-circuiting connections, whereby the fuse is automatically short-circuited on reversing the motors as explained.

47. In a controller, the combination of the circuit-varying connections and the terminals for controlling the same, the bridging spring-contacts working between said terminals and reversing and fuse short-circuiting terminals between which said contacts pass by continued movement of the controller, as explained.

48. In a controller the combination of the relatively-movable flat parts carrying respectively the terminals to be connected and the self-expanding bridging-contacts, the latter being interposed between the former and each making lateral contact with two of the others as explained.

49. The combination with a controller for two or more motors and the conductors between the terminals thereof and the parts of motors to be controlled, of opposed series of terminals interposed in said conductors, and corresponding series of bridging-contacts, to connect corresponding terminals of the opposed series and also to connect together the terminals of that series which are connected to the controller-terminals, to avoid breaking the through-circuits from the other motor, as explained.

50. In combination with a controller for a plurality of motors, cut-out terminals having connections with the circuit-making parts of the controller, opposed cut-out terminals connected with the respective elements of the motors, and a bridging-contact for each part of the motors to be cut out, adapted to enter between two opposed terminals; all the bridging-contacts for each motor being separated into an independent group and being arranged to likewise enter between and electrically connect all these terminals having connection with the controller which controls the motor to which the group of contacts belong, as set forth.

51. In a multiple-break controller for electrically-propelled vehicles, the combination of the moving contacts, and the series of fixed terminals with which the contacts combine to complete a connection; two or more terminals being elongated where it is desired to maintain a connection during continued movement of the contacts, and the remainder being omitted and their space permanently bridged, in order to reduce friction between sliding connections, as explained.

52. In an electric make and break, the combination of the terminal piece 52, and the thimble-shaped wearing-tip corresponding in length and diameter to the transverse dimensions of the terminal piece and secured at one end thereof rotatably and removably, for the purpose explained.

53. A multiple electric make and break, consisting of bridging-contacts and a transverse series of tips 58 secured by pins or screws rotatably upon a suitable base, whereby said tips rotate on making or breaking contact but are rubbed during contact, as herein explained.

54. A multiple electric make and break comprising a transverse series of rotatable terminals and intervening bridging spring-contacts bearing uniformly and simultaneously on opposite sides of the terminals to prevent free rotation during contact and insure rubbing contact as explained.

55. In a current-controller, the combination of two relatively-movable plane parts provided with coöperating circuit-closing contacts spaced apart thereon with unobstructed passages between them, said plane parts being spaced apart by about the height of the contacts and with the contacts of one part projecting into the unobstructed spaces between the contacts on the other part and in lateral impingement with the latter in order to bridge said spaces, substantially as set forth.

56. An electric controller having its contacts arranged to establish a complete series running step, a parallel series running step in which the motors have one each of their elements in series relation, while the other elements of said motors are in parallel relation one to the other, and a complete parallel running step arranged in the order named and with suitable intermediate resistance steps, substantially as herein explained.

57. An electric controller for a plurality of motors having a number of running steps established respectively by a series of contacts arranged to direct the current to all the elements of both motors in series, a succeeding series of contacts arranged for delivering the working current to the armatures in multiple and to the fields in series, and a third series of contacts arranged to deliver the working current to the respective motors in parallel, and means for closing said contacts successively in the order named and vice versa, as herein explained.

58. An electric controller for a plurality of motors having a number of running steps established respectively by a series of contacts arranged to direct the current to all the elements of both motors in series, a succeeding series of contacts arranged for delivering the working current to the armatures in multiple and to the fields in series, and a third series of contacts arranged to deliver the working current to the respective motors in parallel, and means for closing said contacts successively in the order named and vice versa, the through-circuit from the line being uninterrupted while passing from one working step to another, substantially as explained.

59. In a device for making electrical contact, the combination of an elongated part upon which a coöperating conducting part slides, and a rotatable tip at the end of said elongated part and forming a continuation thereof as herein explained.

SLAUGHTER W. HUFF.

Witnesses:
C. E. HITCHCOCK,
HENRY C. NEESON.